(12) United States Patent
Wei et al.

(10) Patent No.: US 11,025,703 B1
(45) Date of Patent: *Jun. 1, 2021

(54) SCHEDULED EXECUTION OF INSTANCES

(71) Applicant: Amazon Technologies, Inc., Seattle, WA (US)

(72) Inventors: Eric Paul Wei, Seattle, WA (US); Albert Park Niemoller, Seattle, WA (US); James Alfred Gordon Greenfield, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 379 days.

This patent is subject to a terminal disclaimer.

(21) Appl. No.: 15/346,068

(22) Filed: Nov. 8, 2016

Related U.S. Application Data

(62) Division of application No. 13/788,234, filed on Mar. 7, 2013, now Pat. No. 9,521,188.

(51) Int. Cl.
*G06F 15/16* (2006.01)
*H04L 29/08* (2006.01)
*H04L 29/06* (2006.01)

(52) U.S. Cl.
CPC .............. *H04L 67/10* (2013.01); *H04L 67/02* (2013.01); *H04L 67/42* (2013.01)

(58) Field of Classification Search
CPC ......... H04L 67/10; H04L 67/02; H04L 67/42; H04L 29/08072; H04L 29/06
See application file for complete search history.

(56) References Cited

U.S. PATENT DOCUMENTS

| | | | |
|---|---|---|---|
| 6,438,573 B1 | 8/2002 | Nilsen | |
| 6,799,195 B1* | 9/2004 | Thibault | G05B 19/41835 700/4 |
| 7,415,708 B2* | 8/2008 | Knauerhase | G06F 9/4881 718/1 |
| 8,041,792 B2 | 10/2011 | Donaghey et al. | |
| 8,051,180 B2* | 11/2011 | Mazzaferri | G06F 3/1415 709/227 |
| 8,424,007 B1 | 4/2013 | Hernacki et al. | |
| 8,666,804 B2* | 3/2014 | Barnes, Jr. | H04M 1/72519 705/14.1 |
| 9,239,951 B2* | 1/2016 | Hoffberg | G06F 9/453 |
| 9,910,708 B2* | 3/2018 | Williamson | G06F 9/5027 |
| 9,939,981 B2* | 4/2018 | Varadharajan | G06F 3/0481 |

(Continued)

OTHER PUBLICATIONS

CS-2011-09 Deconstructing Amazon EC2 Spot Instance Pricing (Technion—Computer Science Department—Technical Report CS-2011-09—2011) (Year: 2011).*

*Primary Examiner* — Razu A Miah
(74) *Attorney, Agent, or Firm* — BakerHostetler

(57) ABSTRACT

Techniques are disclosed for a client-and-server architecture where the client makes scheduled execution of instances to the server. The server may then launch occurrences as indicated by one of these API calls at each of the scheduled times. The server may also implement operations to selectively execute particular occurrences, such as executing a new occurrence only when no other occurrences are still running. In other embodiments, the server may implement pricing information in a determination of whether to execute a particular occurrence.

20 Claims, 8 Drawing Sheets

(56) References Cited

U.S. PATENT DOCUMENTS

| | | | |
|---|---|---|---|
| 2004/0268347 A1* | 12/2004 | Knauerhase | G06F 9/45533 718/1 |
| 2005/0114440 A1* | 5/2005 | Waxman | G06F 9/505 709/203 |
| 2009/0031307 A1* | 1/2009 | Chodroff | G06F 11/3055 718/100 |
| 2009/0150529 A1 | 6/2009 | Tripathi | |
| 2009/0164639 A1* | 6/2009 | Sylvain | H04L 65/104 709/227 |
| 2009/0222737 A1* | 9/2009 | Liesche | G06F 17/30873 715/738 |
| 2009/0276771 A1* | 11/2009 | Nickolov | G06F 9/4856 717/177 |
| 2009/0282101 A1* | 11/2009 | Lim | G06F 11/1471 709/203 |
| 2009/0327471 A1* | 12/2009 | Astete | G06F 9/45533 709/223 |
| 2010/0125778 A1* | 5/2010 | Kelkar | G06F 17/243 715/223 |
| 2010/0242099 A1* | 9/2010 | Tsao | H04L 41/0253 726/5 |
| 2010/0281107 A1* | 11/2010 | Fallows | G06F 9/54 709/203 |
| 2010/0333100 A1* | 12/2010 | Miyazaki | G06F 9/4881 718/103 |
| 2011/0041126 A1* | 2/2011 | Levy | G06F 9/5072 718/1 |
| 2011/0126198 A1* | 5/2011 | Vilke | G06F 9/54 718/1 |
| 2011/0179417 A1* | 7/2011 | Inakoshi | G06J 1/00 718/1 |
| 2011/0219373 A1* | 9/2011 | Nam | G06F 9/455 718/1 |
| 2011/0265164 A1* | 10/2011 | Lucovsky | G06F 9/45533 726/7 |
| 2012/0030670 A1* | 2/2012 | Vijay | G06F 11/0712 718/1 |
| 2012/0110572 A1* | 5/2012 | Kodi | G06F 9/5027 718/1 |
| 2012/0159634 A1* | 6/2012 | Haikney | G06F 21/53 726/25 |
| 2012/0185848 A1 | 7/2012 | Devarakonda et al. | |
| 2012/0311575 A1* | 12/2012 | Song | G06F 9/45558 718/1 |
| 2012/0331463 A1* | 12/2012 | Orveillon | G06F 8/63 718/1 |
| 2013/0060993 A1 | 3/2013 | Park et al. | |
| 2013/0097601 A1* | 4/2013 | Podvratnik | G06F 9/5027 718/1 |
| 2013/0160011 A1* | 6/2013 | Corrie | G06F 9/455 718/1 |
| 2013/0263117 A1 | 10/2013 | Konik et al. | |
| 2013/0282792 A1* | 10/2013 | Graham | G06F 21/41 709/203 |
| 2013/0283273 A1* | 10/2013 | Miyazaki | G06F 9/45533 718/1 |
| 2014/0052558 A1* | 2/2014 | Rogel | G06Q 30/06 705/26.1 |
| 2014/0282518 A1* | 9/2014 | Banerjee | G06F 9/45533 718/1 |
| 2015/0019737 A1* | 1/2015 | Kim | G06F 9/5061 709/226 |
| 2015/0074060 A1* | 3/2015 | Varadharajan | G06F 17/30233 707/649 |
| 2015/0169206 A1* | 6/2015 | Balakrishnan | H04L 41/0273 715/740 |
| 2015/0201008 A1* | 7/2015 | Momchilov | G06F 9/4451 709/203 |
| 2015/0207754 A1* | 7/2015 | Johnson | H04L 47/125 709/226 |

* cited by examiner

SCHEDULED EXECUTION OF INSTANCES

CROSS-REFERENCE TO RELATED APPLICATIONS

The present application is a divisional of U.S. patent application Ser. No. 13/788,234, entitled "SCHEDULED EXECUTION OF INSTANCES", filed Mar. 7, 2013, the contents of which are hereby incorporated by reference in their entirety.

BACKGROUND

An application programming interface (API) is a specification that sets forth routines that may be invoked, and how those routines may be invoked. Calls to a particular API may then be used to effectuate the performance of certain actions. For instance, a client computer and a server computer may be communicatively coupled via a network, and the client may send the server calls in an API that the server implements. In turn, the server may receive these calls, and perform the associated processing.

BRIEF DESCRIPTION OF DRAWINGS

Various embodiments in accordance with the present disclosure will be described with reference to the drawings, in which.

DETAILED DESCRIPTION

Figure 1:
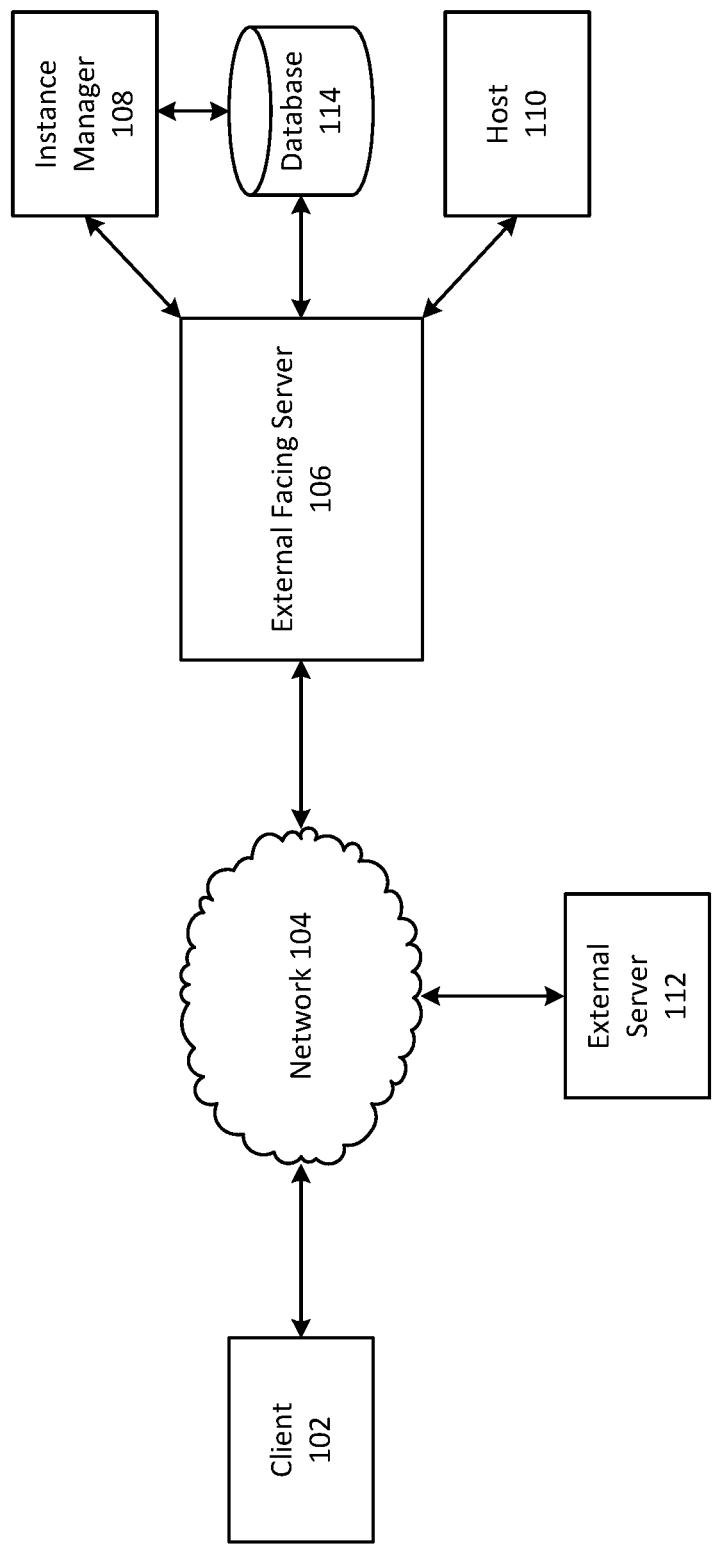
FIG. 1 depicts an example system in which scheduled execution of instances may be implemented.

This document describes techniques for scheduling execution of an instance, as well as other actions, among various embodiments. (For example, the instance may be a virtual machine instance or an instance that runs on bare hardware without use of a hypervisor.) In an example embodiment, a computing service may receive a request from a user that specifies an action (e.g., to run an instance), and a schedule to execute that action (e.g., at 12:30 am each day). In response to this request, the computing service may determine that a time at which the instance is scheduled to run has been reached (e.g., it is 12:30 am on some day), and then determine whether other requirements are met. For instance, a requirement may be that only one of these instances may run at a time; that no more than a threshold number of these instances may run at a time; that no more than a threshold number of instances have run within a recent period of time; or that a current cost of running the instance is below a maximum allowed cost.

In other embodiments, history information about how previous instances have run may be used to determine the requirements for running the present instance. For example, it may be that these instances function as black boxes—that it may be determined that they are running, but it may not be determined whether they are still progressing towards successful completion. In such cases, history information about for how long instances run may be used to determine how long it normally takes for an instance to successfully complete. Then, where the present instance runs for significantly longer than what is normal, it may be considered to have failed, and be terminated.

Embodiments of the present disclosure are directed to techniques for allowing interaction with a web service, such as a data storage service or a computing service. For example, a computing service that offers processing (through the use of instances) and data storage services is accessible through one or more application programming interfaces (APIs) that is usable by requestors of the computing service to access various capabilities of the computing service. Requestors may, for instance, use the one or more APIs to store data, retrieve stored data, or run instances, such as to process data or to perform other operations.

In an embodiment, one or more APIs of a computing service allow users to upload or select virtual machine volumes from a catalog, start and execute instances of these virtual machine volumes and take snapshots of these virtual machine volumes. An API call may, for example, include a location where the virtual machine volume is to be uploaded from along with parameters for its storage.

A customer may request the performance of any of the above operations by sending API requests to the computing service. Similarly, the computing service may provide responses to customer requests. Such requests and responses may be submitted over any suitable communications protocol, such as Hypertext Transfer Protocol (HTTP), File Transfer Protocol (FTP) and the like, in any suitable format, such as Representational State Transfer (REST), Simple Object Access Protocol (SOAP) and the like. The requests and responses may be encoded, for example, using Base 64 encoding, encrypted with a cryptographic key or the like.

The following is an example API call and response to determine the status of two virtual machine instances, i-43a4412a and i-23a3397d. An API call may be made via a HTTPS (hypertext transfer protocol secure) protocol using a URL (uniform resource locator), as follows:

https://[example website].com/?Action=MonitorInstances&InstanceId.1=i-43a4412a&InstanceId.2=i-23a3397d&AUTHPARAMS This request enables the monitoring of the status of a running virtual machine instance. The request may identify an endpoint of the service to which the API call is directed ([example website].com), the type of API call that is requested (MonitorInstances) and an identifier of the two instances for which monitoring is requested (i-43a4412a and i-23a3397d). The type of API call that is requested, as well as the identifier of the two instances for which monitoring is requested are contained within a query string in the URL—the portion to the right of the "?" in the URL. A server that receives such a URL may run a program and pass the query string to the program for processing.

After performing processing in accordance with the query string, the server may return a result to the requestor. The following is an example result that the server may return to the requestor:

```
<MonitorInstancesResponse xmlns="http://[example website].com/doc/2012-08-15/">
  <requestId>59dbff89-35bd-4eac-99ed-be587EXAMPLE</requestId>
  <instancesSet>
    <item>
      <instanceId>i-43a4412a</instanceId>
      <monitoring>
        <state>pending</state>
      </monitoring>
    </item>
    <item>
      <instanceId>i-23a3397d</instanceId>
      <monitoring>
        <state>pending</state>
      </monitoring>
    </item>
  </instancesSet>
</MonitorInstancesResponse>
```

As depicted, the result is formatted in XML (extensible markup language)—a markup language that defines a set of rules for encoding documents in a format that is both human-readable and machine-readable. The first line of the response identifies the type of response (MonitorInstancesResponse) and defines the namespace for the XML file (xmlns="http://[example website].com/doc/2012-08-15"). A namespace is generally an identifier that allows for the disambiguation of homonym identifiers. A tag and associated value identifies the request being responded to (<requestId>59dbff89-35bd-4eac-99ed-be587EXAMPLE</requestId>). This may enable the requestor to distinguish between responses where the requestor makes multiple MonitorInstances requests. Then, there is a section that identifies each instance (e.g., <instanceId>i-43a4412a</instanceId>) along with an associated state of that instance (<state>pending</state>).

FIG. 1 depicts an example system in which scheduled execution of instances may be implemented. As depicted, three computers are connected through network 104. These three computers are client 102, external facing server 106 and external server 112. In turn, two computers and a database are connected to external facing server 106 via an internal network (not illustrated)—instance manager 108, host 110, and database 114. External facing server 106, instance manager 108, host 110 and database 114 may all be part of the same entity's infrastructure—e.g., they may operate in concert to implement services for an entity. In an embodiment, external facing server 106 may interact with outside computers (such as client 102) via a network 104 and issue instructions to instance manager 108 and host 110. For example, the external facing server 106 could be a web server. Instance manager 108 and host 110 may then perform actions in response to those instructions. For instance, instance manager 108 maintain a list of servers that can host instances and use the list to select host machines to run instances and host 110 may host instances.

Given this architecture, when client 102 issues requests to external facing server 106 to start a virtual machine instance, external facing server 106 may issue instructions to instance manager 108 and instance manager 108 may select host 110 to host the virtual machine. For instance, external facing server 106 may receive a request to launch an instance and route the request to instance manager 108 to start a virtual machine instance. After instance manager 108 selects a host to host the virtual machine instance, e.g., host 110, instance manager 108 may issue a request to host 110 to launch the virtual machine instance.

In this manner, client 102 may send external facing server 106 an API call specifying an action, such as a launch instance command, along with a schedule and instance manager 108 and the instance manager 108 may perform the action at the times indicated by the API call without additional input from client 102.

That is, embodiments may include using separate services to carry out functions like launching instances and generating snapshots within a service provider environment. More generally, FIG. 1, as well as the other figures, depicts simplified embodiments to illustrate concepts, and specific implementations may vary.

In embodiments, the procedures for scheduled execution of instances may be implemented on external facing server 106, instance manager 108, host 110, or a combination of those computers. For instance, external facing server 106 may receive an API call to schedule an action from client 102 and store an indication of the call (such as an action to perform and the schedule at which to perform it) in database 114. Then external facing server 106 may send an indication to instance manager 108 to check database 114 for this indication of the call, and instance manager 108 performs the operations to perform instances of the call. In other embodiments, instance manager 108 may periodically check database 114 for indications of calls that have been stored there by external facing server 106, and instance manager 108 may then discover new calls to perform without being directly informed of these new calls by external facing server 106.

FIGS. 2-4 and 6 depict example operating procedures for embodiments of the present disclosure. It may be appreciated that there are embodiments of the disclosure that implement fewer, or more, operating procedures than the ones depicted in FIGS. 2-4 and 6. For example, there may be embodiments that implement either operation 210 or operation 212 of FIG. 2, but do not implement both of these operations. It may also be appreciated that there are embodiments that implement the operating procedures of FIGS. 2-4 and 6 in a different order than is depicted in FIGS. 2-4 and 6. In embodiments, the operations of FIGS. 2-4 and 6 may be implemented in external facing server 106, instance manager 108, host 110 of FIG. 1, or a combination thereof.

As used herein, identifying particular instances of an object or thing as being "first" or "second" is not intended to limit the number of those instances or to imply that the one marked as being the "first" one is the first instance that has occurred. Rather, these terms are used to distinguish instances from each other. Additionally, it is written that occurrences of actions are performed. Where the same action is being performed multiple times (e.g., start an instance every hour), an occurrence of an action is used to refer to one time that this action is performed.

Figure 2:
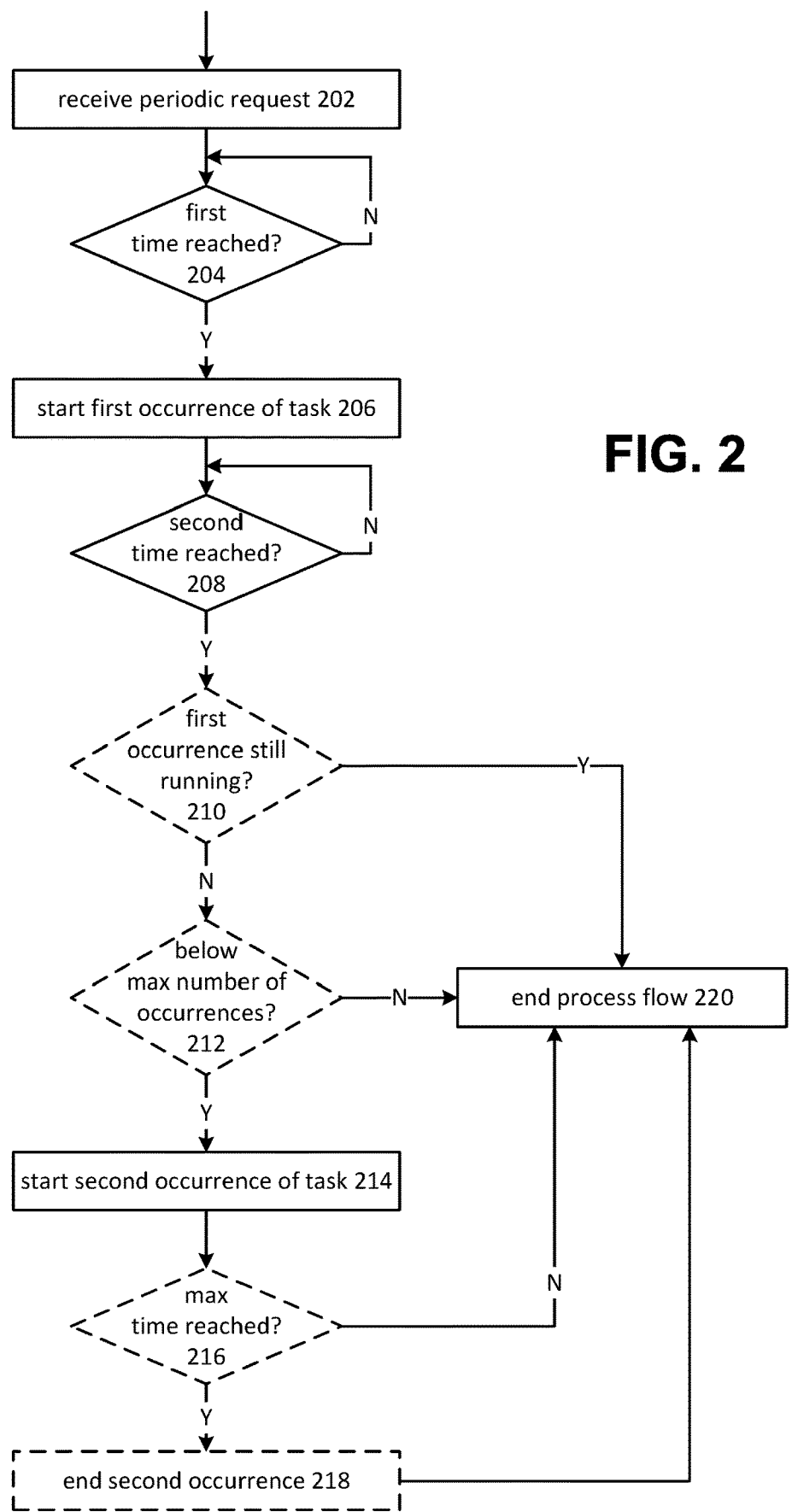
FIG. 2 depicts example operating procedures for a server processing a scheduled execution of an instance from a client.

FIG. 2 depicts example operating procedures for a server processing an API call to perform a scheduled action from a client. The call is referred to herein as being a call to perform a scheduled action, because the action specified in the call is then scheduled to execute multiple times. Where these are referred to in the plural form—as API calls to perform scheduled actions—that is to indicate that a client may send multiple such calls to a server, and each one of these calls may be scheduled to run periodically for multiple times. It may be appreciated that these techniques may be applied to calls that are scheduled to run multiple times, even if these scheduled times are not strictly periodic. An embodiment of where scheduled, periodic calls may be implemented may be to start an instance that receives data from the INTERNET or a storage service, uses that data to update a web page (e.g., with an indication of whether a particular server is running where the received data follows from the instance pinging that server) and then shuts down. Since the instance is not constantly retrieving data and updating the web page, the instance does not need to constantly run (at a cost of processing resources), and so may be run only at some times.

Another example of scheduled execution of instances would be to start up and tear down entire cloud-computing systems. For example, a business may not just use one instance, or even multiple instances operating independently. A business may use multiple instances operating in concert. In such a situation, a business's instances may be started just before the start of the business day, and the business's instances may be shut down at the close of the business day. This may be more broadly extended to forming cloud computing resources at a scheduled time, where the resources work with each other—e.g., one instance performs a federation services role, one instance performs a login role and one instance performs a mail server role, and accessing the mail server involves coordinated action from all three instances. Such embodiments are described in more detail with reference to FIG. 5, below.

The operating procedures of FIG. 2 begin with operation 202, which depicts receiving a request. In embodiments, an API call may be received from a client computer (such as client 102 of FIG. 1). In a conventional manner, the client would send an API call each time the client desires that the API call be implemented. In contrast, in FIG. 2, the client may send one API call that identifies multiple times at which an associated action is to be processed.

In embodiments, an API call comprises a hypertext transfer protocol (HTTP) or hypertext transfer protocol secure (HTTPS) uniform resource locator (URL)—e.g., https://[example website].com/?Action=RunInstances&ImageId=i-43a4412a &MaxCount=1&MinCount=1&AUTHPARAMS. In embodiments, a parameter of such an asynchronous API call is found within the query string of that URL—the portion of that URL to the right of the "?". In addition, in embodiments of the disclosure information such as the schedule to perform the action may also be contained within the query string of the URL.

After operation 202, the process flow moves to operation 204, which depicts determining whether a first time indicated in the schedule has been reached. Determining whether the first time has been reached may involve, for example, executing a process that keeps track of both the current time, when the first time is and compares the two to determine if the current time has exceeded the first time. For example, when the API call indicates that the associated action should be processed once per hour, this first time may be one hour after that API call is received. In an embodiment, after the external facing server 106 receives the request a record can be created in database 114 that includes the information that the computing service uses to launch the instance according to the schedule, for example, the record could identify the action (e.g., run instance), the schedule, the customer ID that submitted the request, instance identifiers for the request, the authorization parameters for the request, etc. The instance manager can periodically access the database and read the record. If this first time of the period time has not yet been reached, then the process flow waits at operation 204 until this first time has been reached.

If this first time of the period of time has been reached, then the process flow moves to operation 206.

Operation 206 depicts starting a first occurrence of the action. This may comprise performing the action as indicated in the API call. For instance, the API call may identify the action as starting an instance, which, once started, will perform some operations before terminating. Where this is the case, operation 206 may comprise starting an instance as indicated by the API call. For example, the instance manager 108 can read the record and determine the parameters for launching the virtual machine. The instance manager 108 can select a server to host the virtual machine and send a RunInstance command to the selected host. In response to the command, the host can launch the instance.

After a first occurrence of the action has been started in operation 206, the process flow moves to operation 208, which depicts determining whether a second time specified by the schedule has been reached. Operation 208 may be implemented in a manner similar to how operation 204 is implemented. Continuing with the example of the action being scheduled to be processed every hour, the first time may be one hour after the API call is received, and the second time may be one hour after the first time—or two hours after the API call is received. If this second time has not yet been reached, then the process flow waits at operation 208 until this second time has been reached. If this second time of the period of time has been reached, then the process flow moves to operation 210.

Turning now to operation 210, while there are generally embodiments that implement fewer operations than are depicted in FIG. 2, in particular, operation 210 (as well as operations 212, 216, and 218) may be considered optional operations, and are indicated as such within FIG. 2 by being represented via dashed lines. Operation 210 depicts determining whether the first occurrence of the action is still running. For instance, where performing the first occurrence of the action comprises executing a process (such as an instance), operation 210 may comprise determining whether this process is still executing. Operation 210 may be implemented in embodiments where there is to be a limit of how many occurrences of a given action are allowed to be performed concurrently. It may be that there is a desire by the client to limit the number of occurrences of an action running concurrently because multiple occurrences may read to and write from the same data, and their concurrent execution may cause inconsistent state problems. It may also be that there is a desire by the client to limit the number of occurrences of an action running because running each action costs money and the client is operating on a budget. If the first occurrence of the action is still running, then the process flow moves to operation 220, where the process flow ends. If the first occurrence of the action is no longer running, then the process flow moves to operation 212.

Operation 212 depicts determining whether the number of occurrences currently running is below a maximum number of occurrences allowed to run concurrently. For instance, for budget reasons similar to those stated for operation 210, the client may specify the maximum number of concurrently-running occurrences at 3. Where there are only two concurrently-running instances when the second time is reached, then another occurrence of the action may be begun. Where there are three or more concurrently-running instances when the second time is reached, then another occurrence of the action may not be begun, even though the second time has been reached. If the number of occurrences currently running is not below a maximum number of occurrences allowed to run concurrently, then the process flow moves to operation 220, where the process flow ends. If the number of occurrences currently running is not below a maximum number of occurrences allowed to run concurrently, then the process flow moves to operation 214.

Operation 212 may be more generally expressed as consulting a policy to determine whether to start the second occurrence of the action, beyond merely determining that the time to start the second occurrence of the action has been reached. In this sense, then determining whether the number of occurrences currently running is below a maximum number of occurrences allowed to run concurrently is a case where the policy specifies the maximum number of occurrences that are allowed to run concurrently. Other policies may include whether any other occurrence of the action is still running (e.g., where the maximum number of occurrences that are allowed to run concurrently is one); whether the most recently started occurrence is still running (though previously started occurrences may still be running); whether a budget has been exceeded (where there is a charge associated with performing occurrences of the action); whether it is likely that a budget will be exceeded in performing this occurrence of the action; and whether it is likely that this occurrence of the action will be completed within a given amount of time.

Figure 3:
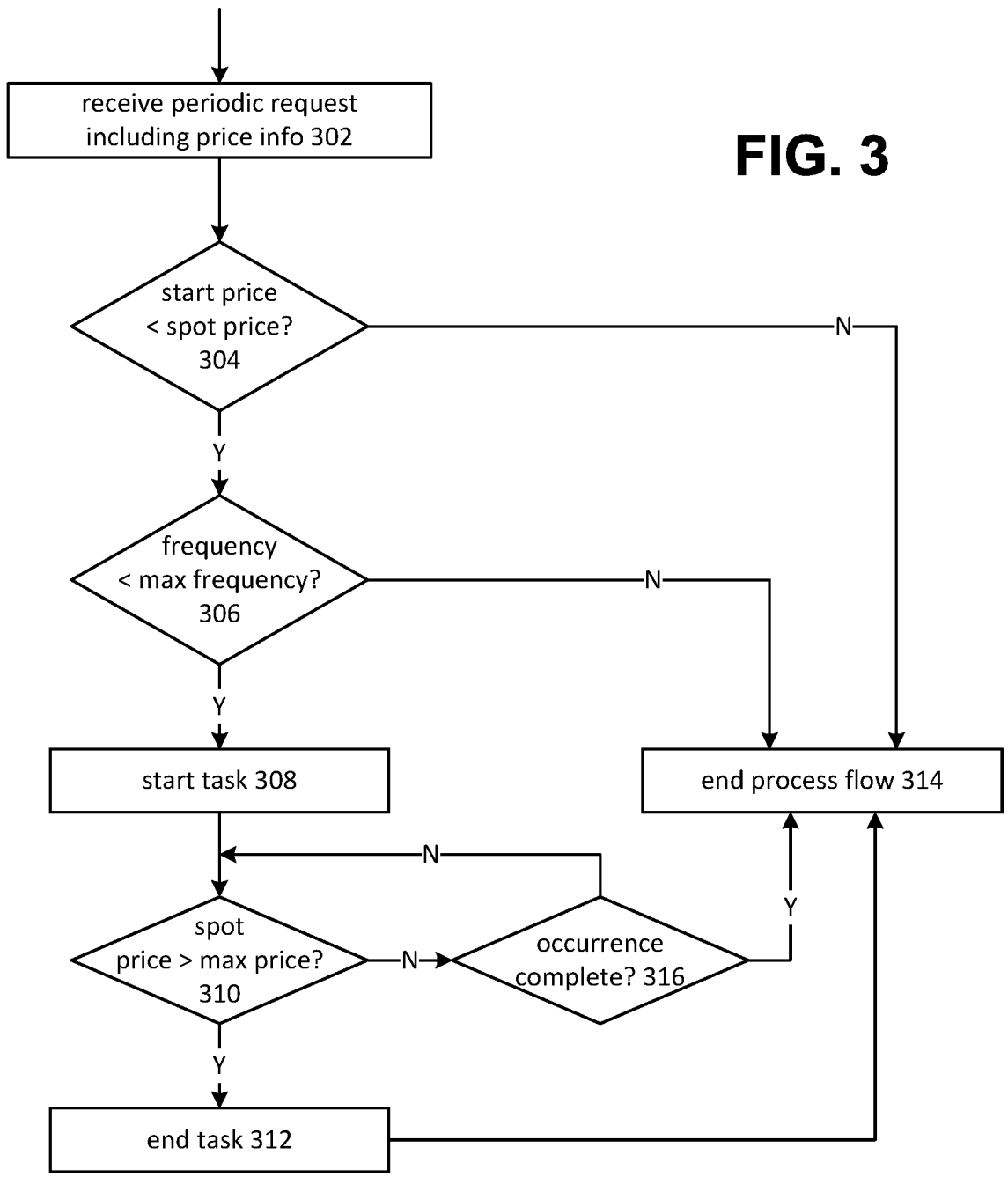
FIG. 3 depicts example operating procedures for a server processing a scheduled execution of an instance from a client while incorporating spot pricing.
Figure 6:
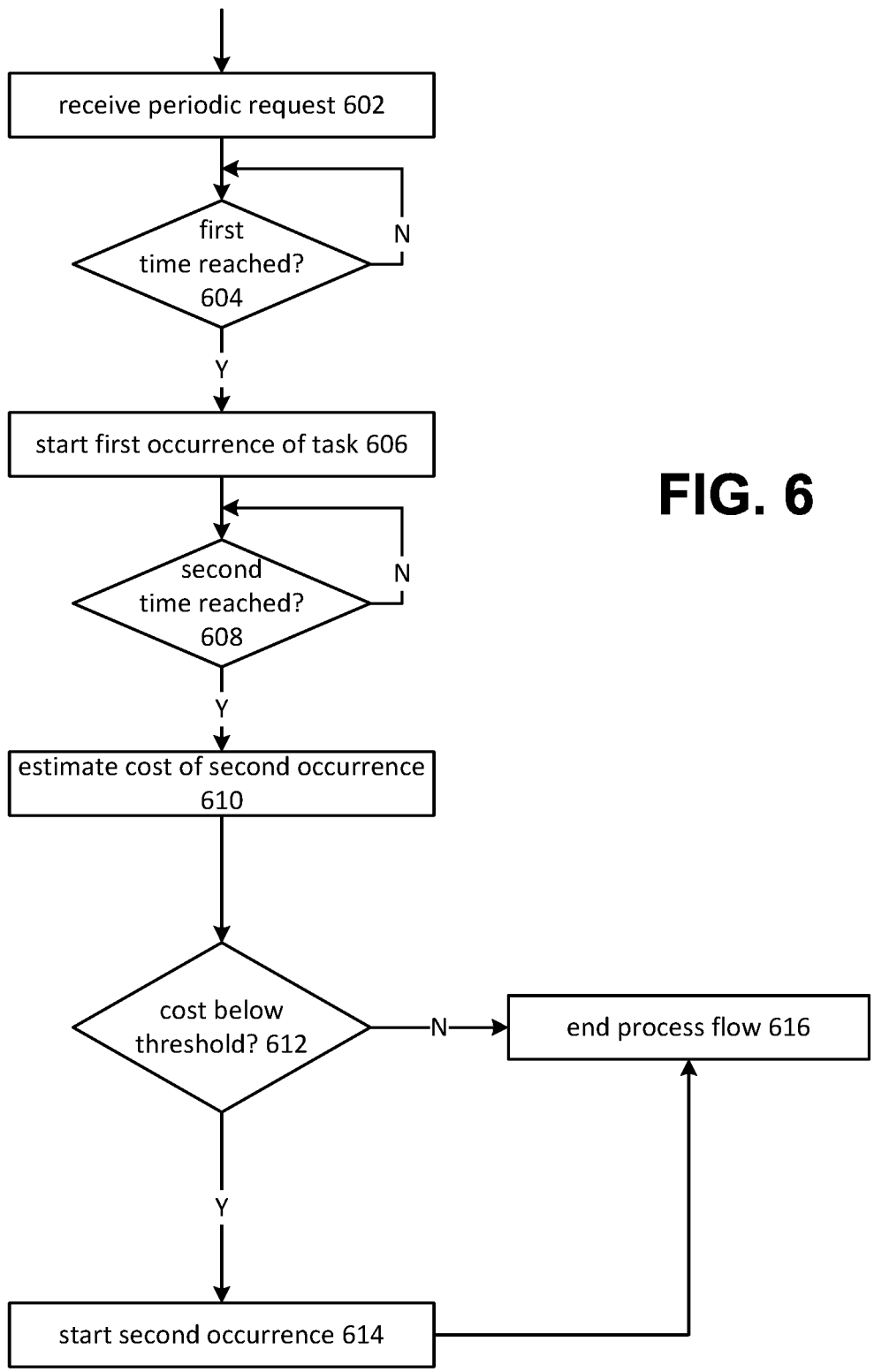
FIG. 6 depicts additional example operating procedures for a server processing a scheduled execution of an instance from a client while incorporating spot pricing.

Another example of a policy incorporates pricing information, as described in more detail with respect to FIGS. 3 and 6. There may be a spot market where customers can bid on computing resources and be able to use those resources as long as their bid exceeds the current spot price. The spot price may vary over time, such as based on supply of and/or demand for those computing resources. There may also be the option to execute occurrences of an action on-demand, where computing capacity is guaranteed at a set time, without regard to the spot market. In embodiments, the on-demand price may be generally higher than the spot-market price, since the on-demand price guarantees access to computing resources, while the spot-market price does not (because the customer's bid may not be sufficient to secure those resources). In this case, the policy may be to attempt to secure computing resources to perform an occurrence of the action on the spot market, and if that fails, fall back on using on-demand resources.

Operation 214 depicts starting a second occurrence of the action. Operation 214 may be implemented in a similar manner as operation 206—starting the first occurrence of the action—is implemented.

After operation 214, the process flow moves to operation 216, where it is determined if a maximum time for the second occurrence of the action to run has been reached. It may be that it is difficult to determine directly whether an occurrence of an action has been successfully completed. For instance, where the action involves starting an instance that performs various operations, it may be possible to determine whether the instance is functioning, but not whether those various operations performed within the instance have been successfully performed. In the absence of this direct information about whether the occurrence has been successfully completed, an amount of time that the occurrence has run for may be used as indirect information about the success of the occurrence. For instance, a client may indicate that no action should run for more than 30 minutes, because the action almost always completes successfully before 30 minutes of running. Here, the maximum time for the second occurrence of the action (and other occurrences of the action) to run may be set at 30 minutes, and when 30 minutes passes since the starting of the second occurrence of the action, that occurrence may be determined to have failed, and the occurrence should be terminated.

In other embodiments, the user that sent the API call may specify a time-to-live (TTL) value in the call, which indicates how long an occurrence of an instance may run before it is to be terminated. Determining whether the maximum time has been reached in operation 216 may comprise determining whether this TTL value has been exceeded by the amount of time the occurrence of the instance has run.

If the maximum time for the second occurrence of the action to run has not been reached, then the process flow moves to operation 220, where the process flow ends. If the maximum time for the second occurrence of the action to run has been reached, then the process flow moves to operation 218.

Operation 218 depicts ending the second occurrence of the action. In other embodiments, rather than ending the second occurrence of the action, a computer that implements these operations may send a notification to the client that the second occurrence is still running after the expiration of the TTL described with respect to operation 216. After operation 218 completes, the process flow moves to operation 220, where the process flow ends.

FIG. 3 depicts example operating procedures for a server processing a scheduled API call from a client while incorporating spot pricing. It may be appreciated that aspects of embodiments regarding determining whether a time to start a periodic action has been reached have been omitted for the sake of clarity. These aspects of embodiments are depicted in FIG. 2. The operating procedures of FIG. 3 may be implemented in concert with the operating procedures of FIG. 2, to collectively implement embodiments where pricing information is factored into processing periodic actions.

In other embodiments, there may be fees associated with performing actions indicated by API calls. Different customer accounts may pay different fees, or one customer account may pay different fees for different actions. For instance, there may be a higher fee for a guarantee that a call will be processed at a given time, and a lower fee for a guarantee only that a call will be processed only if possible after processing all high-priority calls. Then, when a scenario occurs where too much processing requested at a given time, a server may perform a triage on the requested calls. Given the two-status embodiment above (higher fee and lower fee), it may be initially determined that the lower fee calls will not be processed in favor of the higher fee calls, until the projected processing is below a maximum amount. In embodiments, there may be a bidding system for resources at a given time, so that a requestor that is sufficiently motivated and funded may ensure that its request will be executed at that time.

The operating procedures of FIG. 3 begin with operation 302, which depicts receiving a request to invoke an action at scheduled times. Operation 302 may be implemented in a manner similar to operation 202 of FIG. 2. In operation 302, the query string may additionally include pricing information, such as a maximum price at which to start an occurrence of the action (as is used in, for example, operation 304). Pricing information may identify a price per amount of processing resources used (e.g., data storage or central processing unit (CPU) runtime).

The operating procedures of FIG. 3 may be integrated with the operating procedures of FIG. 2. When a computing service attempts to run a scheduled action, the computing service may check the spot price and use spot resources instead of (possibly more expensive) on-demand instances or reserved instances when the spot price is low, and the computing service has confidence that the action will complete before the spot price goes up. This confidence that the action will complete in time may be based on a history of how long the action takes to complete, and a history of the spot price (e.g., it is Monday morning, and the spot price is generally low on Monday mornings).

After operation 302, the instance manager 108 can read the schedule and determine to launch an instance and the process flow moves to operation 304, which depicts determining whether the price identified in the request of operation 302 is below the current spot price. The current spot price is the prevailing price at which an action may use processing resources. When the identified price is above the spot price it means that the prevailing price is less than the client is willing to spend, and that the action should be started. When the identified price is below the spot price it means that the prevailing price is more than the client is willing to spend, and that the action should not be started. Where the identified price is above the spot price, then the process flow moves to operation 314, where the process flow ends. In this case, the instance manager 108 may check the spot price at a later time any try to launch the instance again. Alternatively, the instance manager 108 may launch the instance from a pool of on-demand instances (i.e., from a pool of fixed priced instances). For example, the instance manager 108 could execute the process described with respect to FIG. 2. Where the identified price is below the spot price, then the process flow moves to operation 306.

Operation 306 depicts determining whether starting another instance of the action would cause the frequency of the action to be performed above an allowable frequency at which the action may be performed. There may be a maximum rate at which occurrences of the action are performed, and this may be less than the rate indicated by the period in the request. For example, the period indicated in the request may be to check every 30 minutes whether the spot market is below the identified price, and if that is the case, and if no more than two occurrences have been started in the past 3 hours, then start another occurrence. Where starting another instance of the action would cause the frequency of the action to be performed above an allowable frequency at which the action may be performed, the process flow moves to operation 314, where the process flow ends. Where starting another instance of the action would cause the frequency of the action to be performed below an allowable frequency at which the action may be performed, the process flow moves to operation 308.

Operation 308 depicts starting an occurrence of the action. Operation 308 may be implemented in a manner similar to operation 206 of FIG. 2.

After operation 308, the process flow moves to operation 310, which depicts determining whether the spot price is now above a maximum allowable price for the action. There may be two prices indicated in a request—a price at which an occurrence of an action may be started, and a price that, if reached during execution of the action, the action should be immediately stopped, regardless of how close the action is to completion (other embodiments may factor in how close the action is to completion in determining the maximum price). Where the spot price is above a maximum allowable price for the action, the process flow moves to operation 312—where the occurrence of the action that was started in operation 308 is ended—and then to operation 314, where the entire process flow ends. When the spot price remains below a maximum allowable price for the action, the process flow moves to operation 316.

Operation 316 depicts determining whether the occurrence of the action has been completed. For instance, where the action involves starting an instance that will terminate itself upon completion of the rest of the action, operation 316 may comprise determining if that instance is still running. Where the occurrence of the action has been completed, the process flow moves to operation 314, where the process flow ends. Where the occurrence of the action has not been completed, then the process flow moves back to operation 310, which continues to monitor whether the spot price exceeds the maximum allowable price for the action. In this manner, operations 310 and 316 form a decision loop, which terminates when either the occurrence of the action is complete or the spot price exceeds the maximum allowable price for the action.

Figure 4:
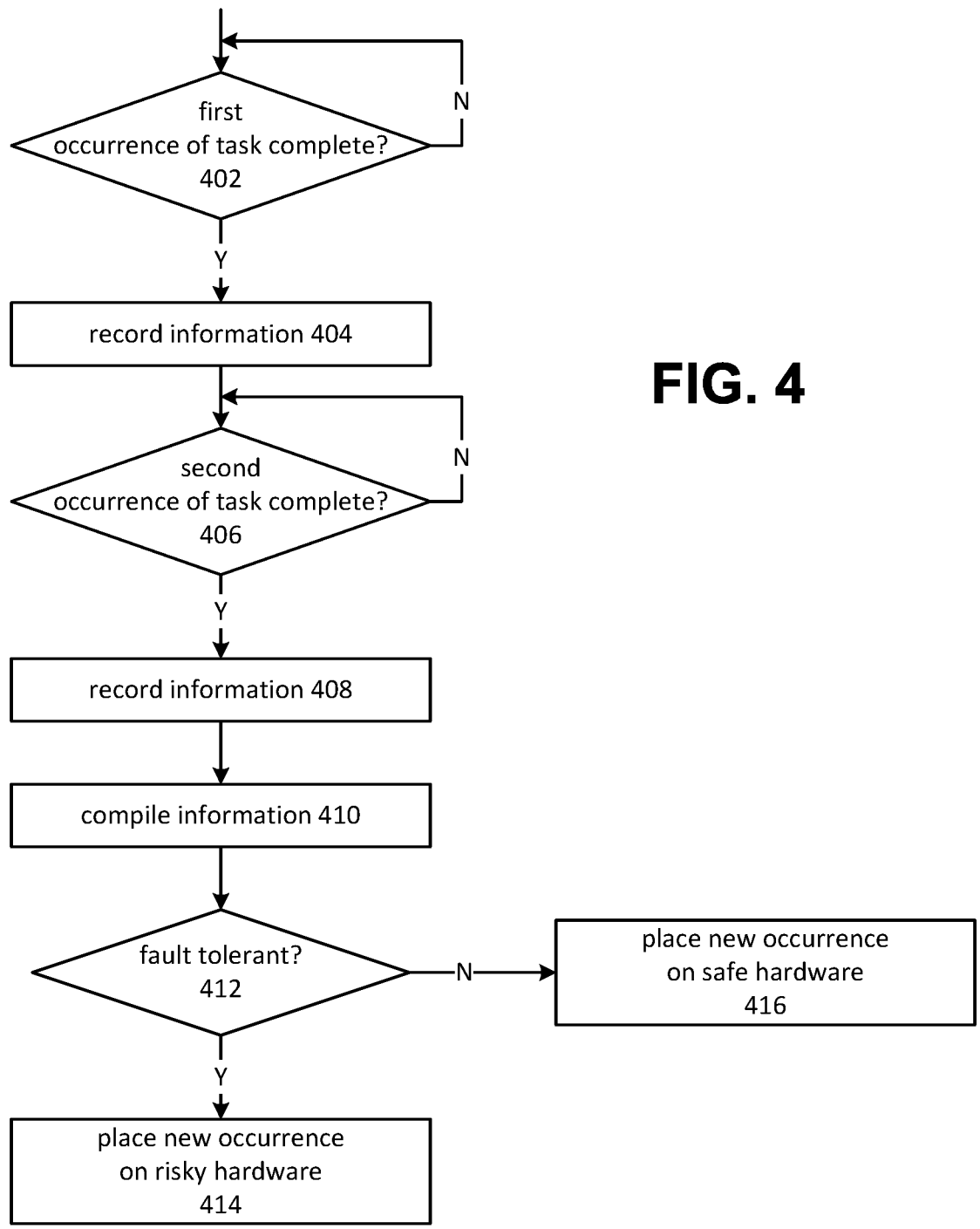
FIG. 4 depicts example operating procedures for a server processing a scheduled execution of an instance from a client while incorporating history information.

FIG. 4 depicts an example operating procedures for a server processing a scheduled API call from a client while incorporating history information. Where the associated action is scheduled to run multiple times, information about how the action has been processed in the past (e.g., how long it takes to process) may be determined in a way that does not exist where an action is only being processed a single time. It may be appreciated that aspects of embodiments regarding determining whether a time to start a periodic action has been reached have been omitted for the sake of clarity. These aspects of embodiments are depicted in FIG. 2. The operating procedures of FIG. 4 may be implemented in concert with the operating procedures of FIG. 2, to collectively implement embodiments where history information is factored into processing periodic actions.

Operation 402 depicts determining whether a first occurrence of the action has been completed. When the first occurrence of the action has not been completed, the process flow loops on operation 402 until the first occurrence of the action has been completed. Where the first occurrence of the action has been completed, then the process flow moves to operation 404.

Operation 404 depicts recording information regarding execution of the first occurrence of the action. This information may indicate how long the first occurrence of the action lasted (in total time and/or processor time), how much bandwidth was used in executing the first occurrence of the action or whether the first occurrence of the action completed successfully or failed (or likely completed successfully or failed). In embodiments, the client that originally sent the API call can send an API call to the instance manager indicating whether the occurrence of the action completed successfully. Alternatively, after the instance completes the action it can be configured to send the API call to the computing service. This may be implemented via a callback API call that the client sends to the computing service in a similar manner as how the client sent the server the original API call. In an embodiment, the computing service may be informed of whether the occurrence completed successfully because the computing service may not have an agent running within the virtual machine that can determine whether the code running within the instance competed the action. This information may be stored by the server, and either combined with information about executing additional occurrences (such as in operation 408) or used as the history information on its own.

Upon completion of operation 404, the process flow moves to operation 406, which depicts determining whether a second occurrence of the action has been completed. Operation 406 may be implemented in a similar manner as operation 402. Where the second occurrence of the action has not been completed, the process flow loops on operation 406 until the second occurrence of the action has been completed. Where the second occurrence of the action has been completed, then the process flow moves to operation 408.

Operation 408 depicts recording information regarding execution of the second occurrence of the action. Operation 408 may be implemented in a similar manner as operation 404.

Upon completion of operation 404, the process flow moves to operation 406, which depicts compiling the information regarding the execution of the first and second occurrences of the action that was recorded in operations 404 and 408. For instance, compiling the information may include determining an average execution time, a standard deviation of the execution time or a rate at which occurrences of the action successfully completed.

Upon completion of operation 408, the process flow moves to operation 412, which depicts using the compiled information to determine whether the client is tolerant of the action failing. For instance, where the action is to launch an instance, the launched instance may then perform some operation that may complete successfully or fail. Here, the action may be considered to have failed, even though the act of launching the instance itself completed successfully, because the operation that is part of the action failed to complete. An action may be determined to be fault tolerant where the client has configured the action (via the request in the API call) such that the action completes successfully relatively rarely. That the action rarely completes successfully may be taken as an indication that it is fault tolerant— that the client does not believe that the action must complete successfully a high amount of the time. Likewise, where an action usually completes successfully, that may be taken as an indication that the action is not fault tolerant—that the client does believe that the action must complete successfully a high amount of the time. Where it is determined that the action is fault tolerant, the process flow moves to operation 414. Where it is determined that the action is not fault tolerant, the process flow moves to operation 416.

Operation 414 depicts placing future occurrences of the action on hardware in response to determining that the action is fault tolerant. The hardware that a fault-tolerant action may be placed on may be hardware that is relatively likely to be the cause of a fault (such as by failing during execution of the action). This may be older or less-reliable hardware that is more likely to fail during execution of an occurrence of the action than other hardware that is available for execution of the action. Placing the action on hardware based on fault-tolerance may allow for the use of hardware that is otherwise unusable due to the risk that a highly-fault-tolerant action would be placed on it were it to be in service.

Operation 416 depicts placing future occurrences of the action on hardware in response to determining that the action is not fault tolerant. The hardware that not a fault-tolerant action may be placed on may be hardware that is highly reliable and is relatively unlikely to be the cause of a fault.

Figure 5:
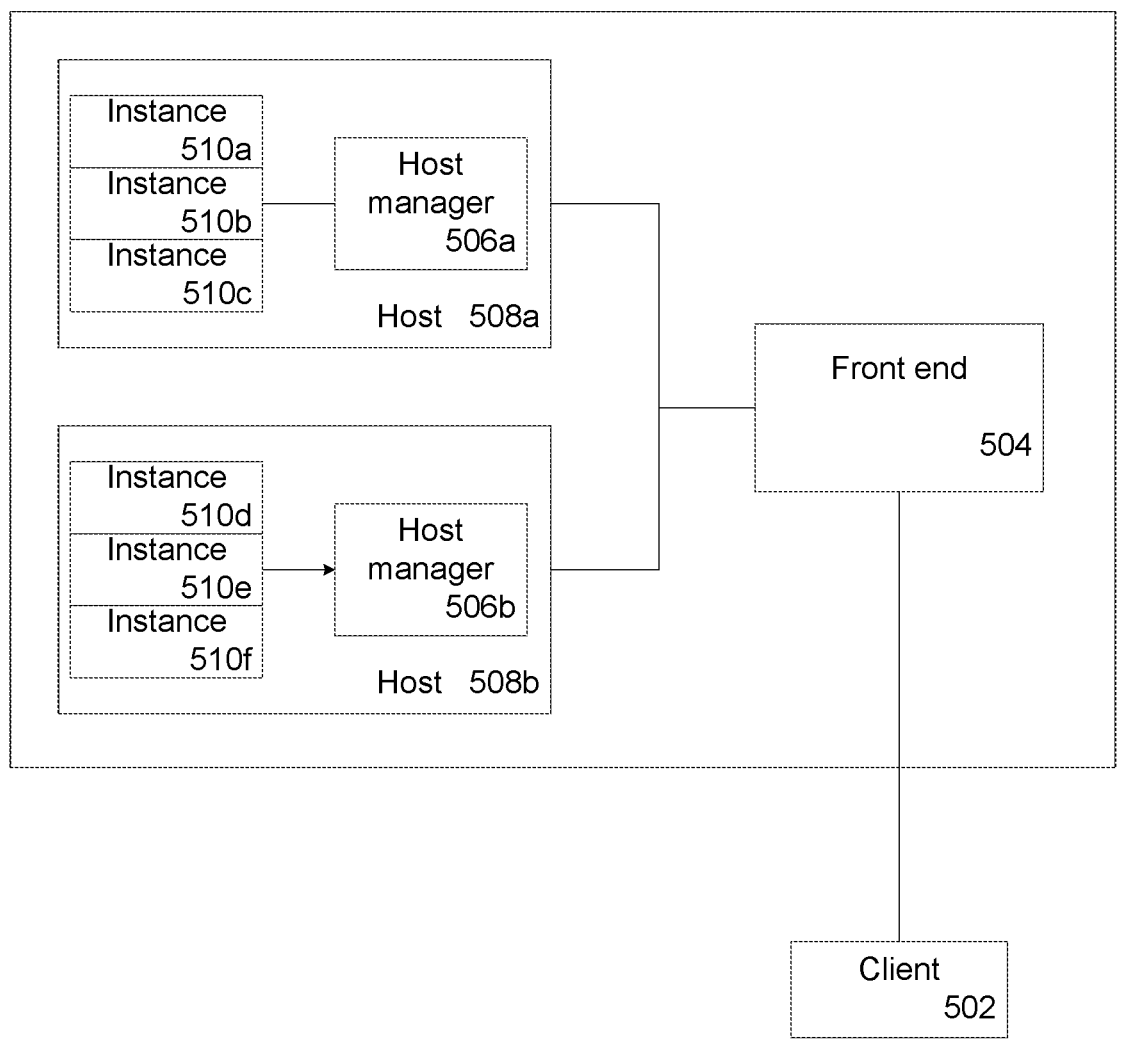
FIG. 5 depicts an example system that may carry out interrelated actions based on a scheduled execution of an instance.

FIG. 5 depicts an example system that may carry out interrelated actions based on a scheduled execution of an instance. Client 502 may send an API call that indicates a scheduled execution of an instance to web services platform 500. Carrying out this scheduled execution of an instance may involve performing interrelated actions, such as launching two instances that need to know a network address for each other so that they can communicate, even though an instance may not be assigned a network address until it is launched. The depicted components and their function will first be discussed, and this will be followed by a discussion of how these components may carry out interrelated actions based on a scheduled execution of an instance.

Web services platform 500 comprises front end 504, and hosts 508a and 508b. This is a simplified embodiment to illustrate these aspects of web services platform 500, and it may be appreciated that there are embodiments of a web services platform that include more (or fewer components). In turn, within web services platform 500, each host comprises a host manager and one or more instances. That is, host 508a comprises host manager 506a, and instances 510a, 510b, and 510c. Likewise, host 508b comprises host manager 506b, and instances 510d, 510e, and 510f In other embodiments, hosts 508a and 508b may be implemented in a similar manner as host 110 of FIG. 1 and carry out similar functions as host 110.

Host managers 506a and 506b may execute within the host partition of their respective host. Host managers 506a and 506b may configure, launch, and terminate instances. Where instance images are stored somewhere other than on the host, host managers 506a and 506b may retrieve and configure these instance images in the process of configuring and launching instances. Host managers 506a and 506b may also create and remove firewalls for use in processing the network communications of instances.

Instances 510a, 510b, 510c, 510d, 510e, and 510f may comprise a virtualized hardware configuration and an operating system that runs on that virtualized hardware configuration. This virtualized hardware configuration may include an amount of virtual memory, a number and type of virtual processors (e.g., 32-bit or 64-bit processors, and an associated architecture), an amount of virtual storage, and a level of I/O performance.

Front end 504 may execute within an instance, or may execute in the host partition of a host. Front end 504 may host APIs used as an interface between web services platform 500 and client 502. Front end 504 may receive API calls from client 502, and based on those calls, determine whether there is sufficient capacity of a specific kind (e.g., a specific hardware class with which to execute a particular instance type) to fulfill the action indicated by those calls. Front end 504 may also be in communication with hosts 508a and 508b and determine which host will carry out the action specified in a call. Where these actions are scheduled for some time after the calls are received, front end 504 may store an indication of these actions and monitor when the scheduled time to carry out these actions occurs. When the scheduled time does occur, front end 504 may determine which host among hosts 508a and 508b will carry out the action, and indicate to that host to carry out that action. In other embodiments, front end 504 may be implemented in a similar manner as external facing server 106 of FIG. 1 and carry out similar functions as external facing server 106.

Front end 504 may receive API calls from client 502 that indicate an action, such as performing a scheduled API call of an instance. These actions may be interrelated. For instance, the action may involve launching instances 510a and 510d where these instances are configured to communicate with each other. That is, the action may involve launching each instance, and configuring each instance both with its own network address and an indication of the other instance's network address. Where an instance is typically assigned a network address while it is being launched, it may be that neither instance can be fully launched and configured before the other instance has been configured (since fully configuring one instance requires knowledge of the other instance's network address). In such a scenario, front end 504 or host manager 506a or 506b may reserve a network address for each instance. Then each instance may be configured and launched using these reserved network addresses.

In other embodiments, one instance may be configured until it is assigned a network address. Then, the other instance may be configured with both its own network address and the network address of the first instance (which has already been assigned). Finally, the configuring the first instance may resume and it may be configured with the network address of the other instance, which has already been assigned.

In other embodiments, launching the two instances so that they may communicate with each other may include configuring a firewall on each of host manager 506a and 506b. When launching the two instances, front end 504 (or another component of web services platform 500) may have an indication that each instance is to be able to communicate with the other instance. Then, front end 504 may instruct host manager 506a to configure its firewall to allow instance 510a on host 508a to communicate with instance 510d, and instruct host manager 506b to configure its firewall to allow instance 510d on host 508b to communicate with instance 510a.

FIG. 6 depicts additional example operating procedures for a server processing a scheduled execution of an instance from a client while incorporating spot pricing. The operating procedures of FIG. 6 are similar to those of FIG. 3 in that they both deal with spot pricing. The operating procedures of FIG. 3 generally depict embodiments where instances are started based on a current spot price, and where a maximum frequency of starting occurrences is capped. In contrast, the operating procedures of FIG. 6 generally depict embodiments where history information on how occurrences of an action execute (such as history information gathered through the operating procedures of FIG. 4) are used to project whether executing another occurrence of the action will meet pricing parameters, and determining whether the execute this additional occurrence based on this projection.

The operating procedures of FIG. 6 begin with operation 602, which depicts receiving a request. In embodiments, an API call may be received from a client computer (such as client 102 of FIG. 1). In a conventional manner, the client would send an API call each time the client desires that the associated action be implemented. In contrast, in FIG. 6, the client may send one API call that identifies multiple times at which the associated action is to be processed.

After operation 602, the process flow moves to operation 604, which depicts determining whether a first time of the period time has been reached. Determining whether the first time has been reached may involve, for example, executing a process that keeps track of both the current time, when the first time is, and compares the two to determine if the current time has exceeded the first time. For example, when the API call indicates that the associated action should be processed once per hour, this first time may be one hour after that API call is received. If this first time of the period time has not yet been reached, then the process flow waits at operation 604 until this first time has been reached. If this first time of the period of time has been reached, then the process flow moves to operation 606.

Operation 606 depicts starting a first occurrence of the action. This may comprise performing the action as indicated in the API call. For instance, the API call may identify the action as starting an instance, which, once started, will perform some operations before terminating. Where this is the case, operation 606 may comprise starting an instance as indicated by the API call.

After a first occurrence of the action has been started in operation 606, the process flow moves to operation 608, which depicts determining whether a second time of the period time has been reached. Operation 608 may be implemented in a manner similar to how operation 604 is implemented. Continuing with the example of the action being scheduled to be processed every hour, the first time may be one hour after the API call is received, and the second time may be one hour after the first time—or two hours after the API call is received. If this second time of the period time has not yet been reached, then the process flow waits at operation 608 until this second time has been reached. If this second time of the period of time has been reached, then the process flow moves to operation 610.

Operation 610 depicts estimating a cost of running a second occurrence of the action. This estimate may be based on the actual cost of running the first occurrence of the action, and of running other occurrences of the action. For instance, occurrences of the action run at night may use more processing resources than occurrences of the action running during the day. It may be that the action incorporates conditional logic such that it performs additional operations at night (e.g., during the day, the action checks several websites and gathers information from them, and at night the action both checks those websites and gathers information from them, and performs analysis of the data gathered over the course of the day).

Figure 7:
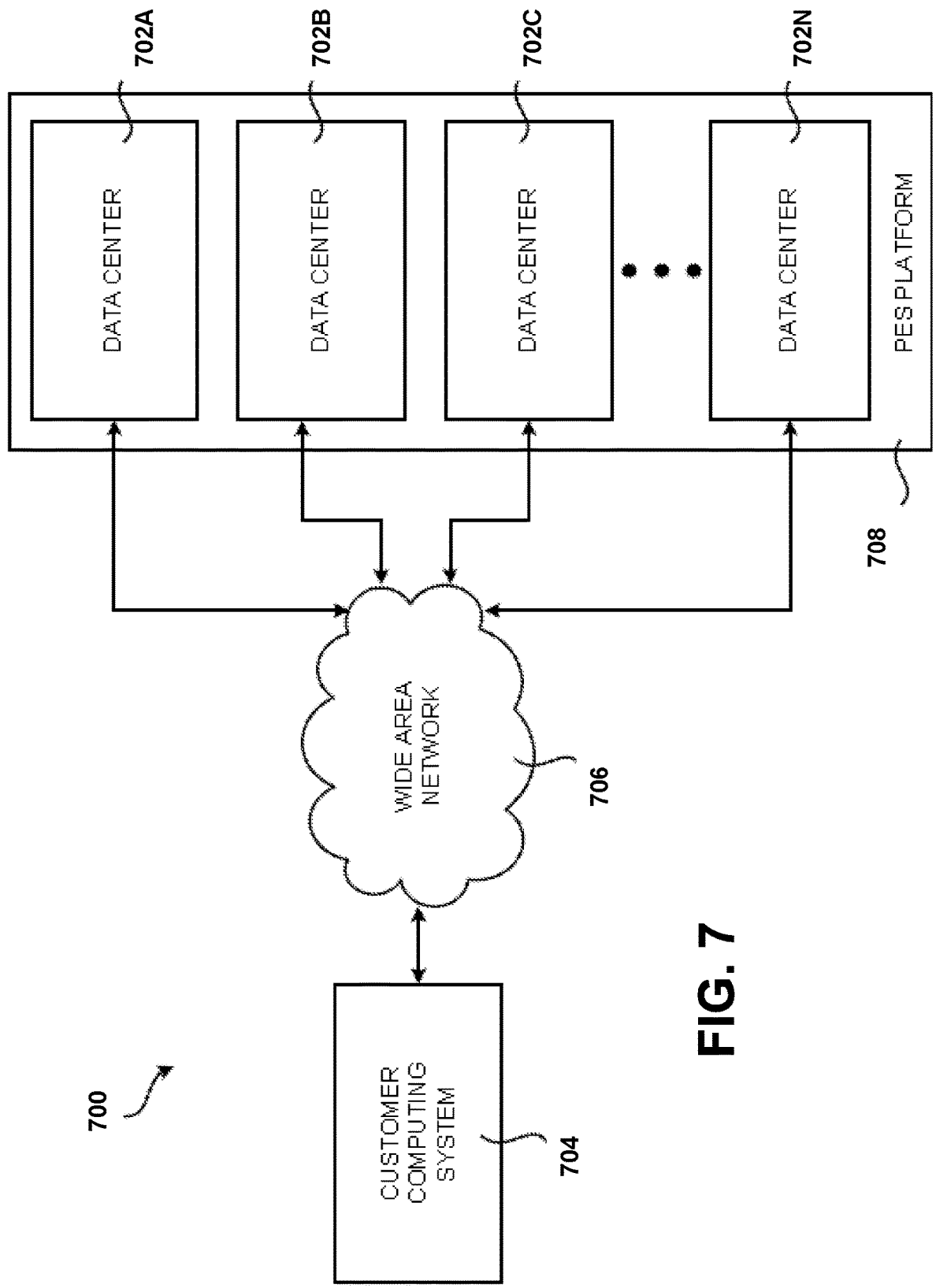
FIG. 7 depicts a computing system for launching virtual machine instances.

In other embodiments, running previous occurrences of the action, including the first occurrence, may be done on different types of hardware (e.g., the different sizes of computing resources discussed with respect to FIG. 7), and data may be gathered on how much time and cost is involved with running the action on these different hardware configurations. In such embodiments, estimating a cost of running a second occurrence of an action may then comprise estimating a cost of running a second occurrence of the action based on available hardware configurations.

Where occurrences of the action are run using virtual machine instances, these virtual machine instances may vary (such as in number of virtual CPU cores, virtual memory, virtual disk space, or CPU architecture—e.g. x32 or x64). In embodiments, running previous occurrences of the action, including the first occurrence, may be done on different types of virtual machines, and data may be gathered on how much time and cost is involved with running the action on these different virtual machine configurations. In such embodiments, estimating a cost of running a second occurrence of an action may then comprise estimating a cost of running a second occurrence of the action based on available virtual machine configurations.

There may also be a maximum amount of time for which an occurrence of the action may run, as indicated by the customer or otherwise determined. In these embodiments, estimating the cost of running a second occurrence comprises estimating the cost of running the second occurrence on those hardware configurations where it is estimated that the action will complete within the maximum amount of time. In some embodiments, a customer may indicate a preference for running the action as quickly as possible as long as the cost does not exceed a threshold amount. In other embodiments, a customer may indicate a preference for running the action as cheaply as possible as long as the time does not exceed the maximum allowable amount. In all of these embodiments, it is the history of how the action has run in previous occurrences (based on, e.g., the type of hardware it was run on, the time of day/week/month/etc. it was run, the cost it incurred while running, and the amount of time it took to run) that is used in determining whether, and how, to run the current instance of the action.

Figure 8:
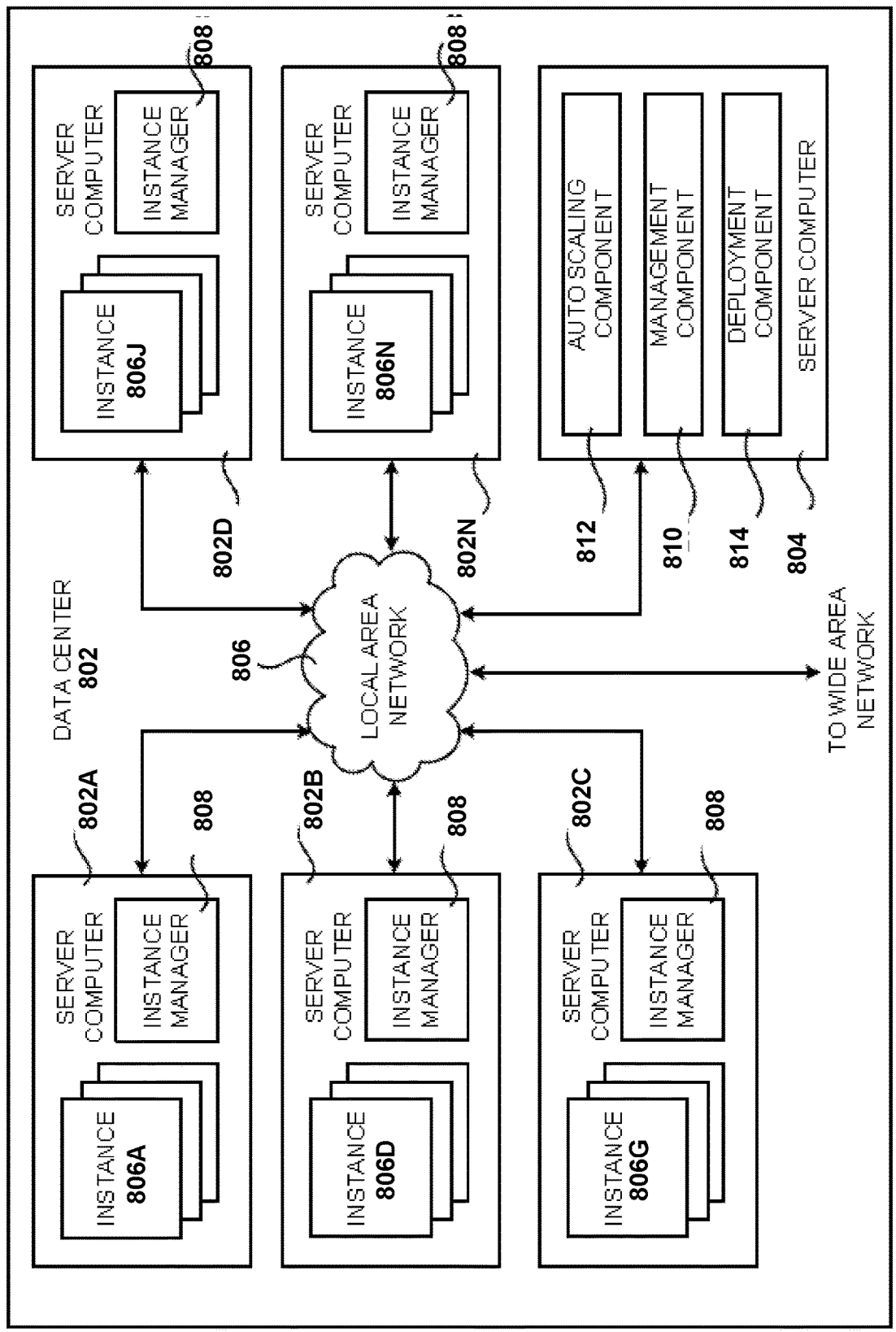
FIG. 8 depicts a computing system diagram that illustrates a configuration for a data center for launching virtual machine instances.

This history information based on how previous occurrences of the action may be used to determine placement of the current occurrence of the action among multiple physical hosts, such as the server computers 802A-802N of FIG. 8. These physical hosts may be heterogeneous—they may be made of different hardware, or they may currently be experiencing different loads. Given that these physical hosts are different, an estimate of how much the current occurrence of the action will cost on these different physical hosts may be used in placing the current occurrence of the action on the host on which the action may be run the most cheaply. Similar determinations may be made for placing the current occurrence of the action on a host such that the action completes as quickly as possible without exceeding a cost limit, or completes as cheaply as possible without exceeding a time limit.

Operation 612 depicts determining whether it is likely that the cost of running a second occurrence of the action will be below a threshold amount. If the cost is estimated to be above the threshold amount, the process flow moves to operation 616, where the process flow ends. If the cost is estimated to be below the threshold amount, the process flow moves to operation 614.

Operation 614 depicts starting a second occurrence of the action. Operation 614 may be implemented in a similar manner as operation 606—starting the first occurrence of the action—is implemented.

After operation 614, the process flow moves to operation 616, where the process flow ends.

FIG. 7 and the following description are intended to provide a brief, general description of a suitable computing environment in which the embodiments described herein may be implemented. In particular, FIG. 7 is a system and network diagram that shows an illustrative operating environment 700 that includes a programmable execution service ("PES") platform 708 (which may be referred to as a "PES 708") for providing on-demand access to computing resources, such as virtual machine instances. In embodiments, PES 708 may be implemented with multiple occurrences of web services platform 500 of FIG. 5, or the combination of external facing server 106, instance manager 108, host 110, and database 114 of FIG. 1 (where this combination or web services platform 500 each serve as a data center 702). As will be described in greater detail below, the computing resources may be launched or otherwise instantiated based upon an expected cost and value of the computing resources to an operator of the PES platform 708.

The PES platform 708 can provide computing resources for executing applications on a permanent or an as-needed basis. The computing resources provided by the PES platform 708 may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute applications, including Web servers, application servers, media servers, database servers, and the like. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as Web servers and/or one large processing resource as a database server, for example.

The computing resources provided by the PES platform 708 are enabled by one or more data centers 702A-702N (which may be referred herein singularly as "a data center 702" or in the plural as "the data centers 702"). The data centers 702 are facilities utilized to house and operate computer systems and associated components. The data centers 702 typically include redundant and backup power, communications, cooling, and security systems. The data centers 702 might also be located in geographically disparate locations. One illustrative configuration for a data center 702 that implements the concepts and technologies disclosed herein for launching virtual machine instances will be described below with regard to FIG. 8.

The customers and other consumers of the PES platform 708 may access the computing resources provided by the data centers 702 over a wide-area network ("WAN") 706. Although a WAN is illustrated in FIG. 7, it should be appreciated that a local-area network ("LAN"), the Internet, or any other networking topology known in the art that connects the data centers 702 to remote customers and other users may be utilized. It should also be appreciated that combinations of such networks might also be utilized.

The customer computing system 704 is a computer utilized by a customer or other consumer of the PES platform 708. For instance, the customer computing system 704 may be a server computer, a desktop or laptop personal computer, a tablet computer, a wireless telephone, a PDA, an e-reader, a game console, a set-top box, or any other computing device capable of accessing the PES platform 708.

As will be described in greater detail below, the customer computing system 704 may be utilized to configure aspects of the computing resources provided by the PES platform 708. In this regard, the PES platform 708 might provide a Web interface through which aspects of its operation may be configured through the use of a Web browser application program executing on the customer computing system 704. Alternatively, a stand-alone application program executing on the customer computing system 704 might access an application programming interface ("API") exposed by the PES platform 708 for performing the configuration operations. Other mechanisms for configuring the operation of the PES platform 708, including launching new virtual machine instances on the PES platform 708, might also be utilized.

According to embodiments disclosed herein, the capacity of purchased computing resources provided by the PES platform 708 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of the PES platform 708 can be scaled on-demand.

Auto scaling is one mechanism for scaling computing resources in response to increases or lulls in demand for the resources. Auto scaling allows customers of the PES platform 708 to configure the platform 708 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in the PES platform 708.

The PES platform 708 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, provide cache warming logic specifying how an application cache should be prepared, and other types of information. The deployment component utilizes the customer-provided configuration and cache warming logic to launch, configure, and prime new instances of computing resources.

FIG. 8 depicts a computing system diagram that illustrates one configuration for a data center 802 that implements a PES platform 708, including the concepts and technologies disclosed herein for launching a virtual machine instance. The example data center 802 shown in FIG. 8 includes several server computers 802A-802N (which may be referred herein singularly as "a server computer 802" or in the plural as "the server computers 802") for providing computing resources for executing an application. The server computers 802 may be standard tower or rack-mount server computers configured appropriately for providing the computing resources described above. For instance, in one implementation the server computers 802 are configured to provide instances 806A-806N of computing resources.

In one embodiment, the instances 806A-806N (which may be referred herein singularly as "an instance 806" or in the plural as "the instances 806") are virtual machine instances. As known in the art, a virtual machine instance is an instance of a software implementation of a machine (i.e. a computer) that executes programs like a physical machine. In the example of virtual machine instances, each of the servers 802 may be configured to execute an instance manager 808 capable of executing the instances. The instance manager 808 might be a hypervisor or another type of program configured to enable the execution of multiple instances 806 on a single server 802, for example. As discussed above, each of the instances 806 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein might be utilized with instances of storage resources, instances of data communications resources, and with other types of resources. The embodiments disclosed herein might also execute all or a portion of an application directly on a computer system without utilizing virtual machine instances.

The data center 802 shown in FIG. 8 also includes a server computer 804 reserved for executing software components for managing the operation of the data center 802, the server computers 802, and the instances 806. In particular, the server computer 804 might execute a management component 810. As discussed above, a customer of the PES platform 808 might utilize the customer computing system 804 to access the management component 810 to configure various aspects of the operation of PES platform 808 and the instances 806 purchased by the customer. For example, the customer may purchase instances and make changes to the configuration of the instances. The customer might also specify settings regarding how the purchased instances are to be scaled in response to demand. The customer might also provide requests to launch instances to the management component 810.

As also described briefly above, an auto scaling component 812 scales the instances 806 based upon rules defined by a customer of the PES platform 808. In one embodiment, for instance, the auto scaling component 812 allows a customer to specify scale up rules for use in determining when new instances should be instantiated and scale down rules for use in determining when existing instances should be terminated.

The auto scaling component 812 may execute on a single server computer 804 or in parallel across multiple server computers 802 in the PES platform 808. In addition, the auto scaling component 812 may consist of a number of subcomponents executing on different server computers 802 or other computing devices in the PES platform 808. The auto scaling component 812 may be implemented as software, hardware, or any combination of the two. The auto scaling component 812 may monitor available computing resources in the PES platform 808 over an internal management network, for example.

As discussed briefly above, the data center 802 may also be configured with a deployment component 814 to assist customers in the deployment of new instances 806 of computing resources. The deployment component 814 may receive a configuration from a customer that includes data describing how new instances 806 should be configured. For example, the configuration might specify one or more applications that should be installed in new instances 806, provide scripts and/or other types of code to be executed for configuring new instances 806, provide cache warming logic specifying how an application cache should be prepared, and other types of information.

The deployment component 814 utilizes the customer-provided configuration and cache warming logic to configure, prime, and launch new instances 806. The configuration, cache warming logic, and other information may be specified by a customer using the management component 810 or by providing this information directly to the deployment component 814. Other mechanisms might also be utilized to configure the operation of the deployment component 810.

In the example data center 802 shown in FIG. 8, an appropriate LAN 806 is utilized to interconnect the server computers 802A-802N and the server computer 804. The LAN 806 is also connected to the WAN 706 illustrated in FIG. 7. It should be appreciated that the network topology illustrated in FIGS. 7 and 8 has been greatly simplified and that many more networks and networking devices may be utilized to interconnect the various computing systems disclosed herein. Appropriate load balancing devices or software modules might also be utilized for balancing a load between each of the data centers 802A-802N, between each of the server computers 802A-802N in each data center 802, and between instances 806 purchased by each customer of the PES platform 808. These network topologies and devices should be apparent to those skilled in the art.

It should be appreciated that the data center 802 described in FIG. 8 is merely illustrative and that other implementations might be utilized. In particular, functionality described herein as being performed by the management component 810, the auto scaling component 812, and the deployment component 814 might be performed by one another, might be performed by other components, or might be performed by a combination of these or other components. Additionally, it should be appreciated that this functionality might be implemented in software, hardware, or a combination of software and hardware. Other implementations should be apparent to those skilled in the art.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dumb terminals, thin-clients, gaming systems and other devices capable of communicating via a network. These devices may be considered to be computing nodes, along with each virtual machine of one or more virtual machines that executes on such devices.

Most embodiments utilize at least one network that would be familiar to those skilled in the art for supporting communications using any of a variety of protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, JAVA servers and business application servers. The server(s) also may be capable of executing programs or scripts in response requests from user devices, such as by executing one or more Web applications that may be implemented as one or more scripts or programs written in any programming language, such as JAVA C, C# or C++ or any scripting language, such as Perl, Python or TCL as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, digital versatile disk (DVD), or other optical storage, magnetic cassettes, magnetic tape, magnetic disk storage, or other magnetic storage devices or any other medium that can be used to store the desired information and that can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected" is to be construed as partly or wholly contained within, attached to or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

While the present disclosure has been made in connection with preferred embodiments, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. Aspects of the disclosure may be implemented with computer-readable storage media, which do not include signals, and/or computer-readable communication media. Thus, the invention, or certain aspects or portions thereof, may take the form of program code (i.e., instructions) embodied in tangible, or non-transitory, media, such as floppy diskettes, CD-ROMs, hard drives or any other machine-readable storage medium. Likewise, certain aspects or portions of the disclosure may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only, and not considered as encompassing all aspects of the disclosure.

What is claimed is:

1. A method, comprising:
   receiving, by an application program interface of a web service, a request comprising an indication of an instance to launch and a periodic time at which to launch the instance, the request being received from a client computer across a communications network;
   determining that a first time indicated by the periodic time has been reached;
   causing a first occurrence of the instance to be launched in response to determining that the first time has been reached;
   determining that a second time indicated by the periodic time has been reached;
   consulting a policy to determine whether to launch a second occurrence of the instance at the second time; and
   causing the second occurrence of the instance to be launched in response to determining that the second time has been reached, and that the policy indicates that the second occurrence of the instance should be launched.

2. The method of claim 1, further comprising:
   in response to determining that the first occurrence of the instance has run for a threshold amount of time, terminating the first occurrence of the instance and re-launch the first occurrence of the instance.

3. The method of claim 2, further comprising:
   determining the threshold amount of time based at least in part on how long the first occurrence of the instance has run in the past.

4. The method of claim 1, further comprising:
   in response to determining that the first occurrence of the instance has run for a threshold amount of time, and in response to determining that a maximum number of attempts to launch the instance has been reached, determining not to retry to launch the first occurrence of the instance and generating an error indicator.

5. A method, comprising:
   receiving, by an interface of a service provider environment, a web service request specifying a schedule for launching a virtual machine within the service provider environment;
   determining that a time specified in the schedule has been reached; and
   launching the virtual machine within the service provider environment in accordance with one or more constraints expressed in a policy.

6. The method of claim 5, wherein a constraint expressed in the policy relates to a maximum number of concurrent launches of the virtual machine, the method further comprising:
   determining that the number of concurrent launches is less than the maximum number of occurrences of the action.

7. The method of claim 5, further comprising:
   restarting the virtual machine in response to determining that the action virtual machine is no longer operating.

8. The method of claim 5, further comprising:
receiving an indication from a client computer that the virtual machine launch completed successfully.

9. The method of claim 5, wherein a constraint in the policy identifies a price at which launches of the virtual machine may be performed, the method further comprising:
determining that a current price in a spot market is above the price at which launches of the virtual machine may be performed; and
in response to determining that the current price in the spot market is above the price at which launches of the virtual machine may be performed, launching the virtual machine using computing resources acquired through an on-demand market with a set price structure.

10. The method of claim 5, further comprising:
determining an expected amount of time that launching the virtual machine takes before launching the virtual machine has been completed, based on a previous launching of the virtual machine.

11. The method of claim 10, further comprising:
determining that the expected amount of time that launching the virtual machine takes is above a threshold amount of time; and
performing another action in response to determining that the expected amount of time that launching the virtual machine takes is above the threshold amount of time.

12. The method of claim 11, wherein performing another action comprises:
sending a message to a customer associated with the launching the virtual machine or terminating a virtual machine associated with the launched the virtual machine.

13. The method of claim 10, further comprising:
selecting a physical host on which to run a virtual machine based on the expected amount of time that launching the virtual machine takes.

14. The method of claim 13, wherein selecting the physical host on which to launch the virtual machine comprises:
determining that the physical host is expected to have enough spare capacity to run the virtual machine for the expected amount of time, or determining that the physical host is expected to be in operation for the expected amount of time.

15. The method as recited in claim 5, wherein the web service request is received by way of an application programming interface.

16. A non-transitory computer-readable storage medium bearing computer-executable instructions that, when executed upon a computer, cause the computer to perform operations comprising:
receiving an indication of an action to perform;
receiving an indication of a periodic time at which to perform the action;
starting a first occurrence of the action upon reaching a first time indicated by the periodic time;
estimating a price to perform a second occurrence of the action based on processing resources associated with performing the first occurrence of the action; and
starting a second occurrence of the action upon reaching a second time indicated by the periodic time, and upon estimating that the price to perform the second action will be below a threshold.

17. The computer-readable storage medium of claim 16, wherein estimating that the price to perform the second action will be below the threshold comprises:
determining a current spot price of performing an occurrence of the action.

18. The computer-readable storage medium of claim 16, wherein estimating that the price to perform the second action will be below the threshold comprises:
determining a likelihood that a current spot price will remain below the threshold or a second threshold for a predetermined amount of time.

19. The computer readable storage medium of claim 16, further bearing computer-executable instructions that, when executed upon the computer, cause the computer to perform operation comprising:
after starting the second occurrence of the action, stopping the second occurrence of the action in response to determining that the current spot price has exceeded the threshold.

20. The non-transitory computer-readable storage medium as recited in claim 16, wherein the operation comprising receiving an indication of an action to perform comprises receiving the indication by way of an application program interface of a web service.

* * * * *